US008467684B2

(12) United States Patent
Kazawa et al.

(10) Patent No.: US 8,467,684 B2
(45) Date of Patent: *Jun. 18, 2013

(54) APPARATUS OF ADJUSTING OPTICAL SIGNAL TRANSMISSION TIMING

(75) Inventors: Tohru Kazawa, Kokubunji (JP); Masaki Ohira, Yokohama (JP); Yusuke Yajima, Fujisawa (JP); Akihiko Tsuchiya, Yokohama (JP); Yoshinobu Morita, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 224 days.

This patent is subject to a terminal disclaimer.

(21) Appl. No.: 13/053,827

(22) Filed: Mar. 22, 2011

(65) Prior Publication Data

US 2011/0170871 A1    Jul. 14, 2011

Related U.S. Application Data

(63) Continuation of application No. 12/434,959, filed on May 4, 2009, now Pat. No. 7,936,992, which is a continuation of application No. 11/730,010, filed on Mar. 29, 2007, now Pat. No. 7,548,694.

(30) Foreign Application Priority Data

Oct. 13, 2006  (JP) .................................. 2006-279443

(51) Int. Cl.
  *H04B 14/00*  (2006.01)
  *H04B 10/272*  (2006.01)
(52) U.S. Cl.
  CPC .................................. *H04B 10/272* (2013.01)
  USPC ........................................................ 398/67

(58) Field of Classification Search
  USPC .......................................... 398/60, 63, 66–67
  See application file for complete search history.

(56) References Cited

U.S. PATENT DOCUMENTS

| 5,930,018 | A | 7/1999 | Effenberger | |
| 7,548,694 | B2 * | 6/2009 | Kazawa et al. | 398/67 |

(Continued)

FOREIGN PATENT DOCUMENTS

| JP | 2109005 | 4/1990 |
| JP | 9326771 | 12/1997 |

(Continued)

OTHER PUBLICATIONS

Japanese Office Action, issued in Japanese Patent Application No. 2007-269645, dated Nov. 1, 2011.

(Continued)

*Primary Examiner* — Shi K Li
(74) *Attorney, Agent, or Firm* — McDermott Will & Emery LLP

(57) ABSTRACT

In a light reception element such as an APD (Avalanche Photo Diode) used for receiving a high-speed and weak optical signal, it is possible to prevent the phenomenon of distortion of a signal inputted after a large-level light is received. A PON (Passive Optical Network) system includes an OLT (Optical Line Terminal) which can impartially and effectively transmit light reception data to each ONU (Optical Network Unit). According to a light reception amplitude received by each ONU, an inter-frame gap of an appropriate length is assigned for each ONU. The OLT includes a unit for measuring and accumulating the reception light amplitude and data on the inter-frame gap of an appropriate length decided in advance according to the characteristic of the light reception device and generates a grant value for assuring an inter-frame gap of an appropriate length by using the both information.

7 Claims, 15 Drawing Sheets

U.S. PATENT DOCUMENTS

2005/0163149 A1    7/2005    Unitt et al.
2007/0127923 A1    6/2007    Dalton et al.

FOREIGN PATENT DOCUMENTS

| | | |
|---|---|---|
| JP | 11068676 | 3/1999 |
| JP | 2000-295266 | 10/2000 |
| JP | 2004-064149 | 2/2004 |
| JP | 2005-006119 | 1/2005 |
| JP | 2005-340931 | 12/2005 |
| JP | 2007-28215 | 2/2007 |
| JP | 2007-259333 | 10/2007 |
| JP | 2009-518889 | 5/2009 |

OTHER PUBLICATIONS

ITU-T Rec. G.984.1, Chapter 8-9, Mar. 2003.
ITU-T Rec. G.984.3, Chapter 10, Feb. 2004.
"Ethernet in the First Mile," IEEE 802.2 Standard Chapter 64, Apr. 19, 2004.
Entire Prosecution of U.S. Appl. No. 11/730,010 to Kazawa, et al., filed Mar. 29, 2007, entitled "Apparatus of Adjusting Optical Signal Transmission Timing".
Entire Prosecution of U.S. Appl. No. 12/434,959 to Kazawa, et al., filed May 4, 2009, entitled "Apparatus of Adjusting Optical Signal Transmission Timing".

* cited by examiner

FIG.5

RECEPTION SIGNAL MANAGEMENT TABLE 500

| ONU-ID | RECEPTION LIGHT POWER |
|---|---|
| 1 | -10dBm |
| 2 | -20dBm |
| ... | ... |
| N | UNMEASURED |

FIG.6

INTER-FRAME GAP DATA 600

| FORWARD RECEPTION LIGHT POWER | INTER-FRAME GAP LENGTH (BYTE) |
|---|---|
| -5dBm | 150 |
| -10dBm | 120 |
| -15dBm | 50 |
| -20dBm | 20 |
| ... | ... |
| UNMEASURED | 15 (DEFAULT) |

FIG.8

INTER-FRAME GAP DATA                    800

| FORWARD RECEPTION LIGHT POWER | BACKWARD RECEPTION LIGHT POWER | INTER-FRAME GAP LENGTH (BYTE) |
|---|---|---|
| −5dBm | −5dBm | 4 |
| −5dBm | −10dBm | 10 |
| −5dBm | −20dBm | 80 |
| −5dBm | −30dBm | 200 |
| . . . | . . . | . . . |
| −20dBm | −5dBm | 4 |
| −20dBm | −10dBm | 4 |
| −20dBm | −20dBm | 4 |
| −20dBm | −30dBm | 10 |
| . . . | . . . | . . . |
| UNMEASURED | UNMEASURED | 15 (DEFAULT) |

FIG.10

ONU DISTANCE TABLE 1000

| ONU-ID | DISTANCE MEASUREMENT VALUE |
|---|---|
| 1 | 2km |
| 2 | 10km |
| ... | ... |
| N | UNMEASURED |

FIG.11

INTER-FRAME GAP DATA 1100

| DISTANCE MEASUREMENT VALUE | INTER-FRAME GAP LENGTH (BYTE) |
|---|---|
| 0km | 150 |
| 2km | 120 |
| 5km | 50 |
| 10km | 20 |
| ... | ... |
| UNMEASURED | 15 (DEFAULT) |

FIG.12

ONU-FRAME GAP CORRESPONDENCE TABLE 1200

| ONU-ID | INTER-FRAME GAP LENGTH (BYTE) |
|--------|-------------------------------|
| 1 | 150 |
| 2 | 120 |
| . . . | 50 |
| N | 20 |
|  | . . . |
|  | 15 (DEFAULT) |

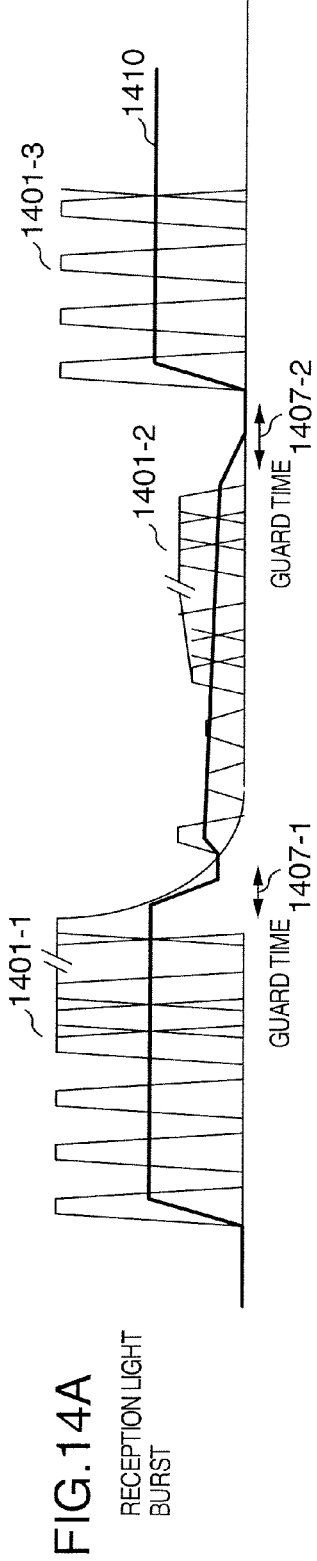
FIG.14A RECEPTION LIGHT BURST
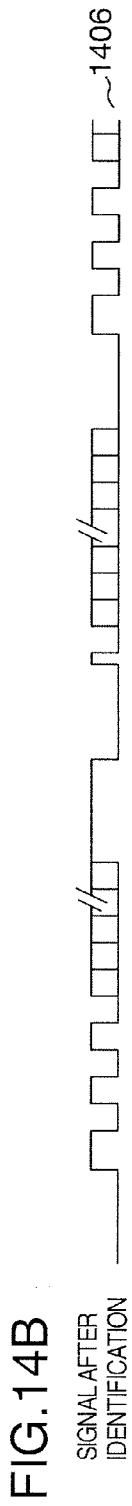
FIG.14B SIGNAL AFTER IDENTIFICATION
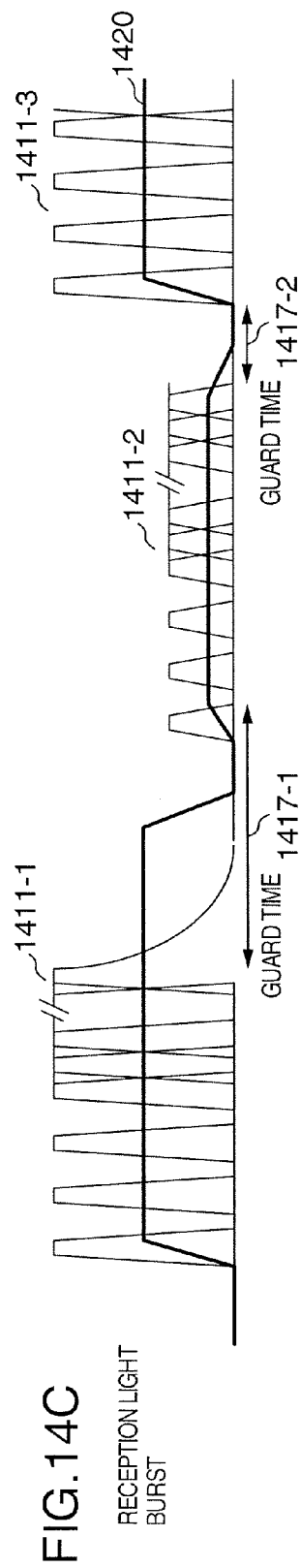
FIG.14C RECEPTION LIGHT BURST
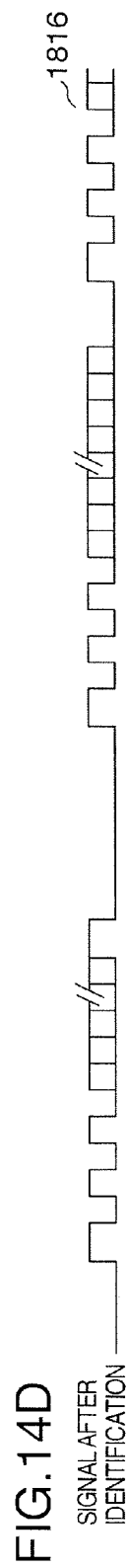
FIG.14D SIGNAL AFTER IDENTIFICATION

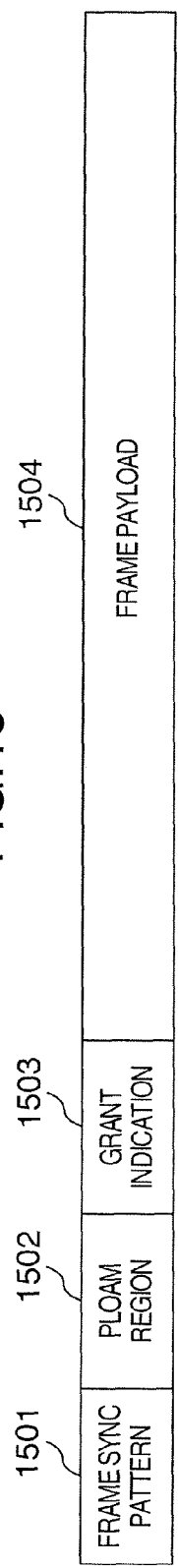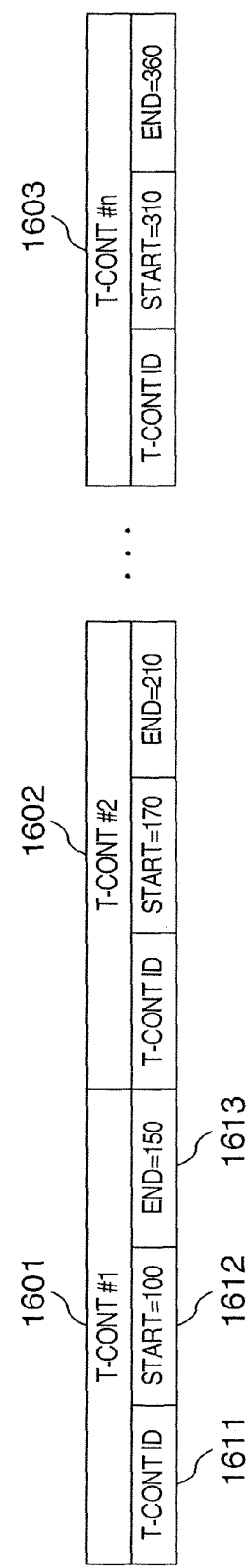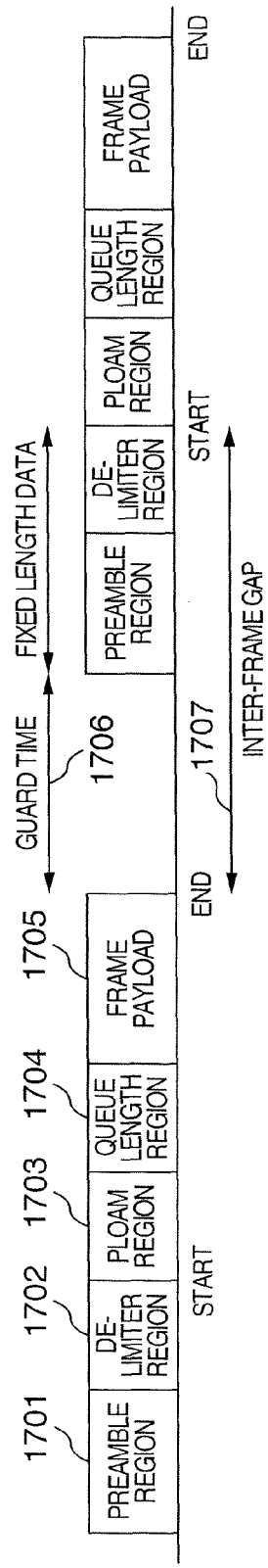

APPARATUS OF ADJUSTING OPTICAL SIGNAL TRANSMISSION TIMING

INCORPORATION BY REFERENCE

The present application is a continuation of U.S. patent application Ser. No. 12/434,959, filed May 4, 2009, now U.S. Pat. No. 7,936,992, which is a continuation of U.S. patent application Ser. No. 11/730,010, filed Mar. 29, 2007, now U.S. Pat. No. 7,548,694, and claims priority from Japanese application JP2006-279443 filed on Oct. 13, 2006, the entire contents of each of which are hereby incorporated by reference into this application.

BACKGROUND OF THE INVENTION

The present invention relates to a passive optical network (PON) system in which a plurality of subscriber connection devices share an optical transmission line.

The PON connects an OLT (Optical Line Terminal) arranged as an optical access system at a station side and an ONU (Optical Network Unit) arranged as an optical access system at a subscriber side on one-to-n basis (n is an integer not smaller than 2) by using a device which passively performs optical signal multiplex/demultiplex such as an optical splitter. A plurality of ONU are respectively connected to subscriber terminals (such as PC) and convert electric signals from the terminals into optical signals and transmit them to the OLT. The optical splitter which have received the optical signals from the plurality of ONU optically (time division) multiplex the optical signals and transmit them to the OLT. Conversely, the optical signal from the OLT is branched into a plurality of optical signals by the optical splitter and transmitted to a plurality of ONU. Each of the ONU selectively receives and processes a signal destined to itself.

As has been described above, upstream optical signals transmitted from a plurality of ONU to the OLT is time-division multiplexed by the optical splitter. The OLT decides and reports the optical signal transmission timing to each of the ONU so that the optical signals from the plurality of ONU will not collide with one another and each of the ONU successively sends the optical signal at the timing received. Since each of the ONU is set at an arbitrary value in the range of optical fiber length, for example, 0 to 20 km, 20 km to 40 km or 40 km to 60 km as is defined in ITU-T Recommendation G. 984.1, Chapter 8 and Chapter 9, the distances between the OLT and the respective ONU, i.e., the optical fiber lengths may not be identical and the transmission delay times of the optical signals transmitted from the respective ONU to the OLT are also different. Accordingly, the OLT should decide the optical signal transmission timing considering the optical signal transmission delay time caused by difference in the distance to each of the ONU.

In order to realize this, the OLT uses the technique called ranging which is described in ITU-T Recommendation G. 984.3, Chapter 10. By using this technique, the OLT adjusts the transmission timing of the respective ONU as if they were at the identical or equal distance from the OLT, so that optical signals from the plurality of ONU will not interfere one another on the optical fiber. That is, the OLT decides and reports the optical signal transmission timing for each ONU by assuming that all the ONU are at an identical distance from the OLT. Furthermore, the OLT reports the optical signal delay time caused by the difference between the assumed distance and the actual distance where each ONU is located, to each ONU. Each ONU transmits an optical signal at the transmission timing reported from the OLT with the reported delay time.

Moreover, in order for a plurality of ONUS to share a communication band of a single optical fiber fairly and efficiently, the ITU-T Recommendation G. 983.4 defines the DBA (Dynamic Bandwidth Assignment) technique for the OLT to assign an ONU upstream band (data transmission position/time) in accordance with a request from each ONU. The OLT also performs bandwidth control based on this technique.

SUMMARY OF THE INVENTION

The technique of ranging can avoid collision of optical signals from a plurality of ONU. However, the collision is not the only problem caused by the different distances from the OLT and the respective ONU. That is, difference in distances between the OLT and ONU causes irregularities not only in the transmission delay time but also in the optical signal attenuation amount due to the difference in the lengths of the optical transmission paths. The power levels of the optical signals which the OLT receives from the respective ONU also have great variations. For example, even if each ONU transmits an optical signal of an identical power level, an optical signal of a large level reaches from ONU near the OLT and an optical signal of a small level reaches from ONU far from the OLT.

The power of the optical signal from an ONU is defined in the ITU-T Recommendation G. 984.2, Table 2-d, Table 2-e, Table 2-f, and Table 2-g. However, since the attenuation amount differs depending on the actual length of the optical fiber, the levels of the optical signals from the respective ONU greatly differ at the OLT reception point as shown in the aforementioned tables.

The OLT configures a highly-sensitive reception circuit so as to receive these signals. However, in a photo-detector such as the APD (Avalanche Photo Diode) used for receiving a high-speed (such as 1 Gbit/sec or above) and weak (such as in the order of −30 dBm) optical signal such as the recent PON, an output saturation by a large signal and a heat increase associated with reception of a strong optical signal fluctuate the APD multiplication factor. Accordingly, during several tens or hundreds of bit time after receiving a light of a large level, a signal inputted subsequently may be distorted.

ITU-T Recommendation G. 984.3, Chapter 8, FIG. 8-2 defines 12-byte guard time to be set immediately before each upstream signal for preventing collision with a preceding burst signal considering that signals from a plurality of ONU interfere one another.

However, in the OLT, the aforementioned DBA technique assigns a bandwidth such that optical signals from the respective ONU are sent with a small space. Accordingly, even when the aforementioned ranging process is performed and the guard time defined in G. 984.3 is added, if a signal is received while the APD operation is not stabilized after receiving a preceding signal, the signal is distorted and may not be normally received. For example, especially when receiving an optical signal of a small level from an ONU at a far distance immediately after receiving an optical signal of a large level from an ONU at a near distance, the optical signal from the ONU at the far distance may not be normally received by the mal-function of the PD.

It is therefore an object of the present invention to provide an OLT capable of normally receiving optical signals from respective ONU even when optical signals from the ONUs have different power levels.

The aforementioned object can be achieved by measuring powers of the optical signals received from the ONUs by the OLT and adjusting the transmission timing of the optical signal of each ONU in accordance with the optical signal power. That is, the OLT delays the transmission timing of the optical signal of the ONU to be received next to the ONU having a large reception optical signal, so that the OLT can receive the optical signal after the operation of the APD has become normal.

The present invention can provide a PON in which the OLT can normally receive an optical signal from each ONU even when a high-speed and weak signal is transmitted from an ONU to the OLT.

Other objects, features and advantages of the invention will become apparent from the following description of the embodiments of the invention taken in conjunction with the accompanying drawings.

BRIEF DESCRIPTION OF THE DRAWINGS

FIG. 5 is a reception signal management table according to a first embodiment.
FIG. 6 shows inter-frame gap data according to the first embodiment.
FIG. 8 shows inter-frame gap data according to a second embodiment.
FIG. 10 is an ONU distance table according to a third embodiment.
FIG. 11 shows inter-frame gap data according to the third embodiment.
FIG. 12 is an ONU-frame gap correspondence table according to a fourth embodiment.
FIGS. 14A to 14D explain effects of the present invention.
FIG. 15 shows an example of a downstream PON signal frame.
FIG. 16 shows an example of a grant signal.
FIG. 17 shows an example of an upstream PON signal frame.

DESCRIPTION OF THE EMBODIMENTS

Description will now be directed to embodiments of the present invention with reference to the attached drawings.

Embodiment 1

Figure 1:
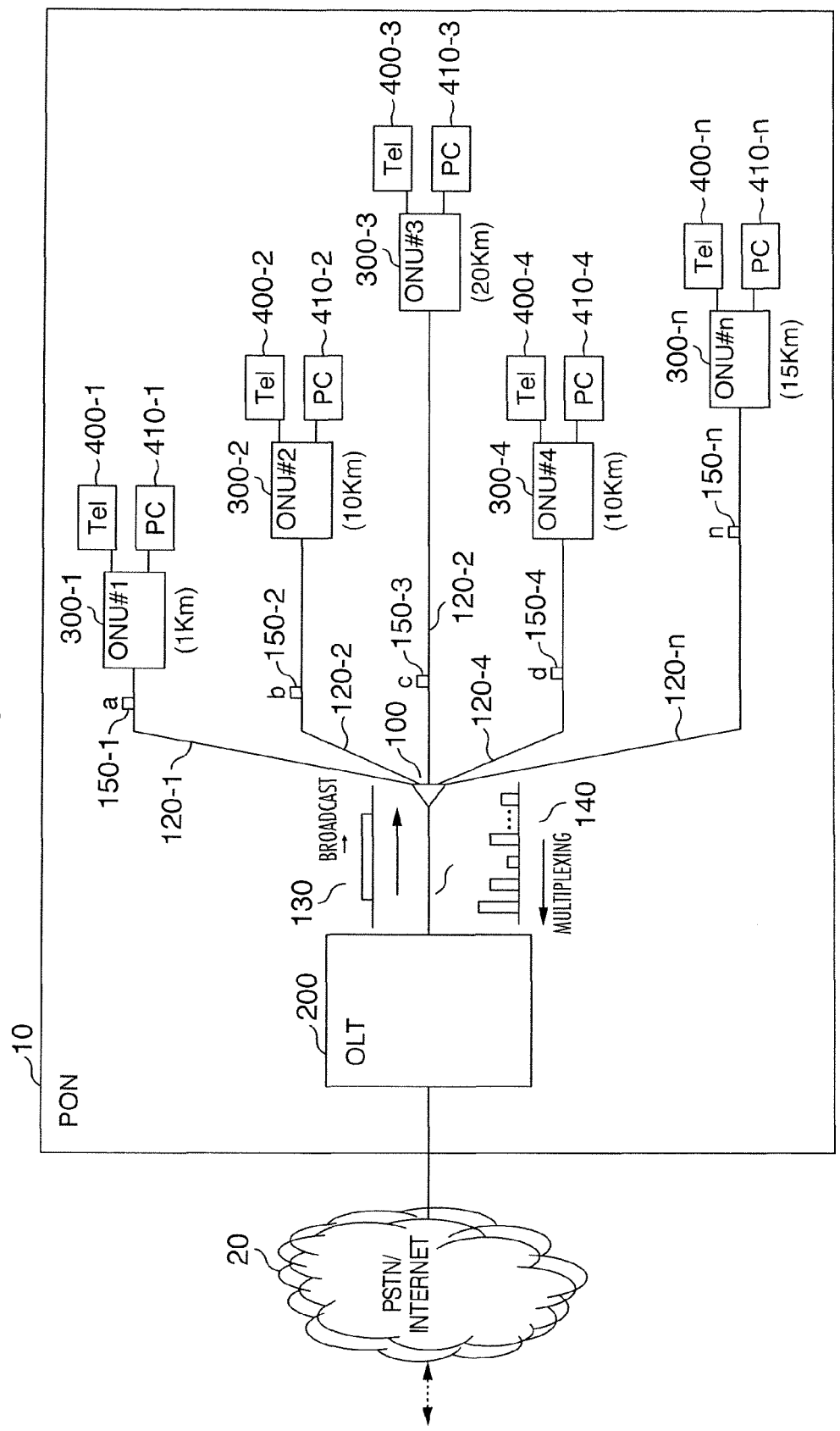
FIG. 1 shows configuration of an optical access network.

FIG. 1 shows configuration of an optical access network to which the present invention is applied.

A PON 10 is formed by an optical splitter 100, an OLT 200 as a station side device installed in a station of a communication business owner, a trunk line fiber 110 connecting the OLT 200 to the optical splitter, a plurality of ONUs 300 as subscriber side devices installed in or near the respective subscriber homes, and a plurality of branch fibers 120 for connecting the optical splitter 100 to the plurality of ONUs 300. The OLT 200 can be connected, for example, to 32 ONUs 300 via the trunk line fiber 110, the optical splitter 1001, and the branch fibers 120. Moreover, each of the ONUs 300 is connected to a user terminal such as a telephone 400 and a personal computer 410. The PON 10 is connected via the OLT 200 to PSTN (Public Switched Telephone Networks) and the Internet 20 for transmitting and receiving data to/from an external network.

FIG. 1 shows five ONUs connected to the OLT 200 by different fiber lengths. In FIG. 1, the fiber lengths from the OLT 200 are as follows: 1 km to the ONU 300-1, 10 km to the ONU 300-2, 20 km to the ONU 300-3, 10 km to the ONU 300-4, and 15 km to the ONU 300-n. Signals destined to the respective ONUs are multiplexed by time division on a signal 130 transmitted in the downstream direction of the ONU from the OLT 200. Each ONU 300 receives the signal 130 and judges whether the signal is destined to itself. If so, the ONU delivers the signal to the telephone 400 and the personal computer 410 according to the signal destination.

Moreover, in the upstream direction from the ONUs 300 to the OLT 200, a signal 150-1 transmitted from the ONU 300-1, a signal 150-2 transmitted from the ONU 300-2, a signal 150-3 transmitted from the ONU 300-3, a signal 150-4 transmitted from the ONU 300-4, and a signal 150-n transmitted from the ONU 300-n are multiplexed by time division after passing the optical splitter 100 and become a signal 140, which reaches the OLT 200. Since the OLT 200 knows in advance at which timing a signal from which ONU is to be received, it identifies the signals from the respective ONUs according to the reception timings and processes them.

FIG. 15 shows an example of a downstream PON signal frame transmitted from the OLT 200 to the respective ONUs 300. The downstream frame is formed by a frame synchronization pattern 1501, a PLOAM region 1502, a grant instruction region 1503, and a frame payload 1504. A ranging time message in FIG. 3 which will be detailed later is stored in the PLOAM region 1502. A ranging request signal 310-1 and a grant, request report signal 320 including information on the timing of starting transmission of an optical signal to each ONU are stored in the grant instruction region 1503. In the frame payload 1504, a user signal from the OLT 200 to the ONU 300 is stored. Details are described in ITU-T Recommendation G. 984.3.

Moreover, FIG. 16 shows an example of the grant instruction region 1503 transmitted from the OLT to the ONU. The grant instruction region 1503 is formed by a T-CONT#1 signal 1601 for controlling the ONU 300-1, a T-CONT#2 signal 1602 for controlling the ONU 300-2, and a T-CONT#n signal 1603 for controlling the ONU 300-n. Furthermore, the T-CONT#1 signal 1601 is formed by a T-CONT ID region 1611, a Start value 1612, and a Stop value 1613. Here, the T-CONT (Trail CONTainer) is a band allocation unit in the DBA. For example, when the ONU has a plurality of transmission buffers, a T-CONT ID as an identifier of the T-CONT is assigned to each of the buffers so that control is performed for each buffer by the OLT. In the example given below, explanation will be given on a case when one ONU has one T-CONT (buffer). However, the present invention can be similarly applied when one ONU has a plurality of T-CONTs. The correspondence relationship between the ONU-ID as information identifying an ONU and the T-CONT ID may be managed by creating a table showing which T-CONT ID is contained for each ONU-ID.

The Start value 1612 indicates the timing allowing each ONU to start transmission of an optical signal. The Start value 1612 and the Stop value 1613 are specified in byte unit. The Start value and the Stop value are described in a portion of the upstream signal 150-1 in FIG. 18 which will be detailed later. The byte length indicates the byte position in the signal to be transmitted. The actual time length varies depending on the transmission bit rate of the signal between the ONU and the OLT. For example, even when the Start value is 40 bytes, if the signal transmission bit rate is high, the time required for transmitting the 40 bytes is short and the actual time specified by the data amount "40 bytes" is short. Conversely, if the signal transmission bit rate is low, the time required for transmitting the 40 bytes is long and the actual time specified by the data amount "40 bytes" also becomes long.

FIG. 17 shows an example of an upstream PON signal frame transmitted from an ONU to the OLT. The upstream signal 150-1 from the ONU 300-1 is formed by a preamble region 1701, a delimiter region 1702, a PLOAM region 1703, a queue length region 1704, and a frame payload 1705. The aforementioned Start value 1612 indicates the start position of the PLOAM region 1703 and the End value 1613 indicates the end position of the frame payload 1705. The guard time 1706 in ITU-T Recommendation G. 984.3 indicates a range from the end position (End value) of the frame payload 1705 of an upstream signal to the start position of the preamble region 1701 of the next upstream signal.

What can be set and reported to each ONU by the OLT is the Start value and the End value in FIG. 17. In this embodiment, the End value of the next optical signal is adjusted in accordance with the power level of the optical signal immediately before. Accordingly, in this embodiment, the length of the inter-frame gap 1707 as a difference between the End value and the Start value is adjusted. It should be noted that the inter-frame gap 1707 is equal to the guard time 1706 added with the length of the preamble region 1701 and the length of the delimiter region 1702. Since the length of the preamble region 1701 and the length of the delimiter region 1702 are fixed, adjustment of the inter-frame gap 1707 has the same meaning as the adjustment of the guard time 1706. That is, when the inter-frame gap 1707 is increased or decreased, the guard time 1706 is also increased or decreased by the same amount.

Figure 2:
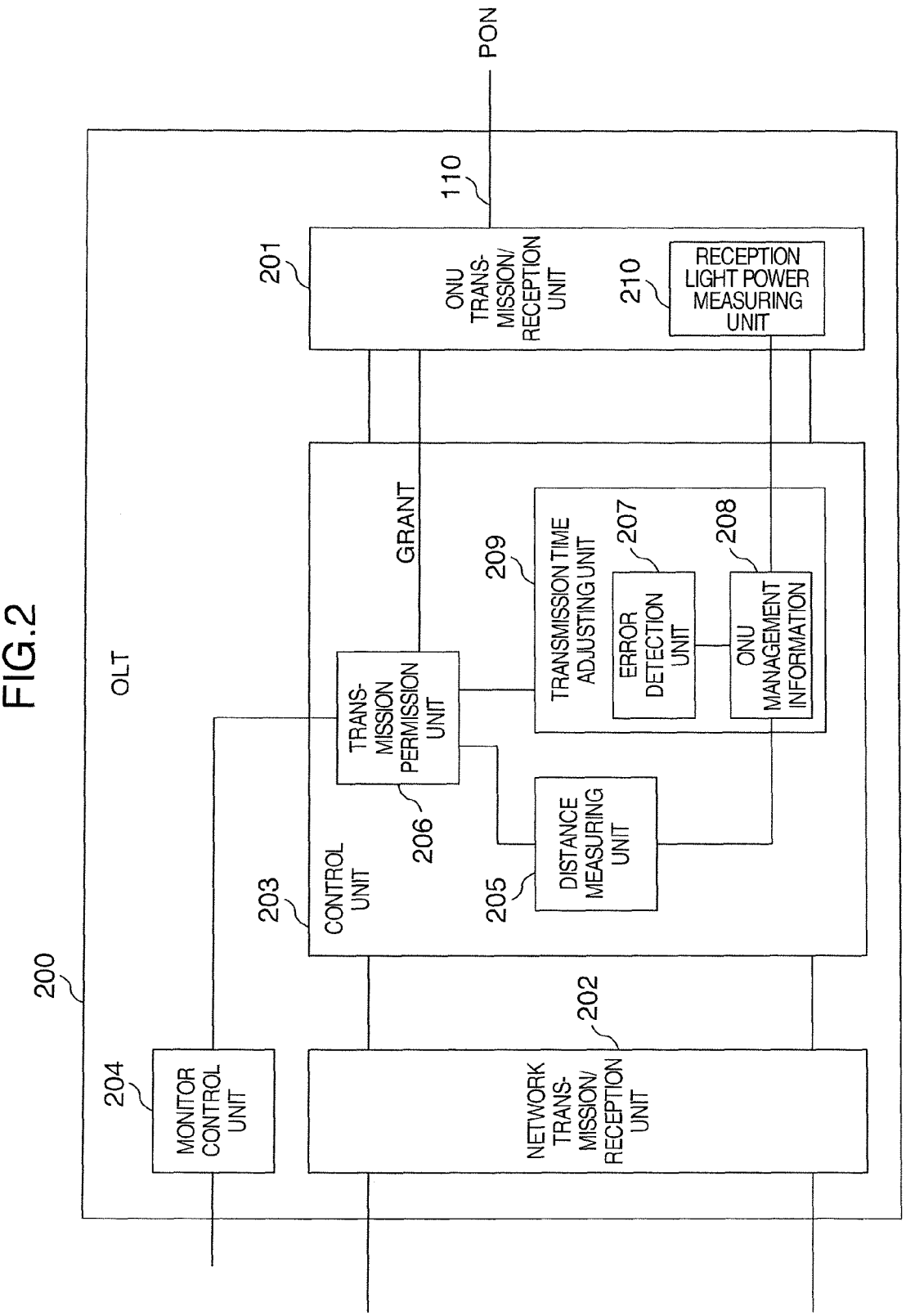
FIG. 2 shows configuration of an OLT.

FIG. 2 shows a configuration example of the OLT 200 according to the present invention. An ONU transmission/reception unit 201 transmits and receives an optical signal to/from the ONU 300 and performs conversion between an optical signal and an electric signal. A network transmission/reception unit 202 transmits/receives a signal to/from an upper-node network such as the PSTN and the Internet 20. A control unit 203 performs a process based on the PON protocol on a signal inputted and outputted. A monitor control unit 204 generates OLT control information such as band setting information to be set in each ONU, according to a control signal received from an external control device and outputs it to a control unit 205.

The ONU transmission/reception unit 201 has a received light power measuring unit 210 for measuring a power of an optical signal received from each ONU 300. Moreover, the control unit 203 further include: a distance measuring unit 205 for performing the ranging process for measuring a distance between the OLT 200 and each ONU 300; a transmission permission unit 206 for deciding a transmission timing of a signal to each ONU; and a transmission time adjusting unit 209 for adjusting the timing for transmitting an optical signal by each ONU according to a distance from the OLT 200 to each ONU 300 and the power of the received optical signal. As will be detailed later, the transmission time adjusting unit 209 has an error detection unit 207 for detecting an error contained in the signal received from each ONU 300 and ONU management information 208 for storing a power of the optical signal received from each ONU and the like. It should be noted that the transmission permission unit 206 may be configured to include the transmission time adjusting unit 209.

Figure 19:
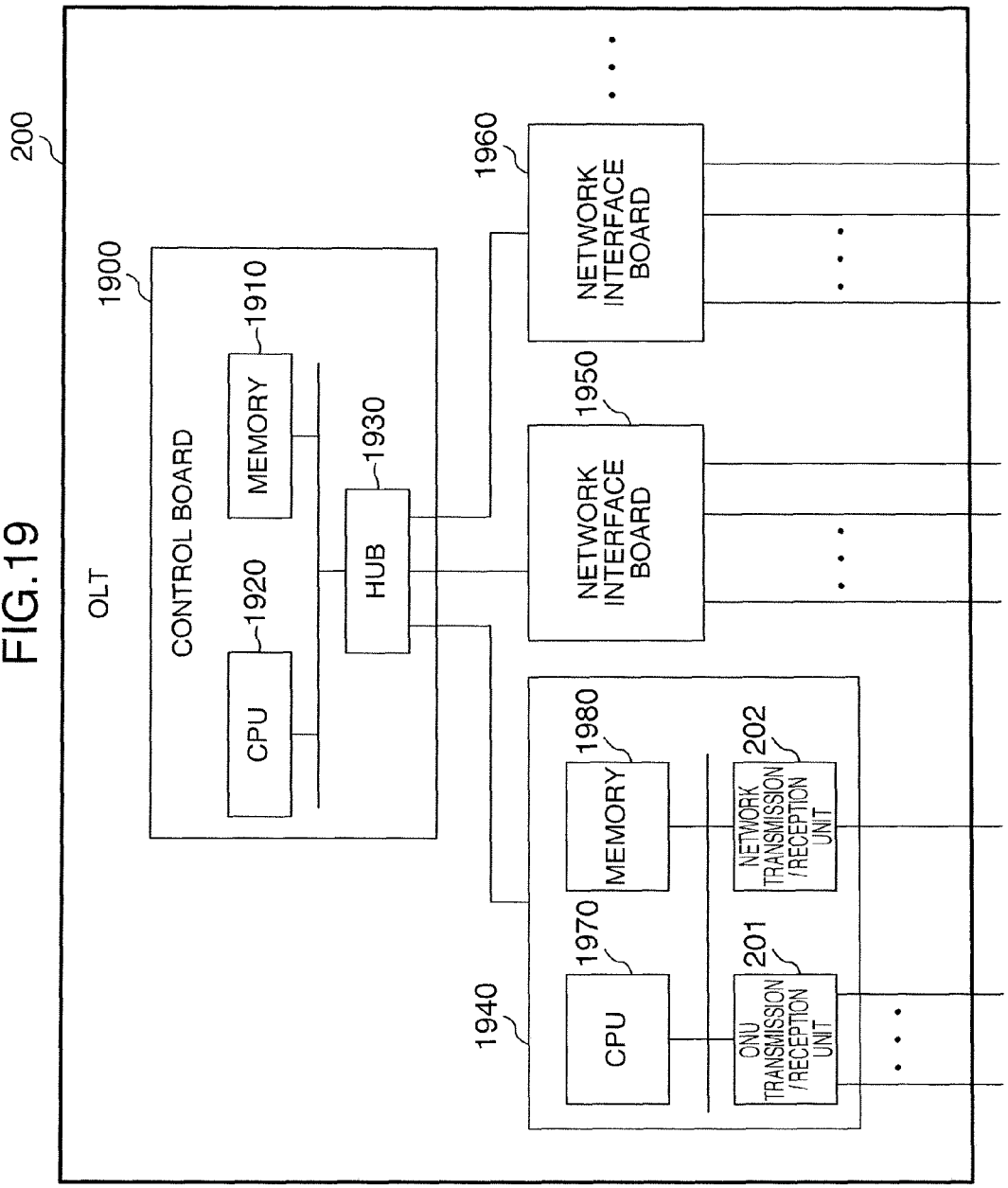
FIG. 19 shows an example of OLT hardware configuration.

FIG. 19 shows an example of hardware configuration of the OLT 200. The OLT 200 includes a control board 1900 for managing operations of the entire device and a plurality of network interface boards 1940, 1950, 1960 each connected to the network for performing signal transmission and reception. The control board 1900 has a memory 1910 and a CPU 1920 and controls the respective network interface boards via a HUB 1930. Each of the network interface boards has an ONU transmission/reception unit 201, a network transmission/reception unit 202, a CPU 1970 performing a process required for transmission/reception between the ONU and the Internet or the PSTN, and a memory 1980. Various processes in this embodiment function when the CPU 1970 executes a program stored in the memory 1980, for example. Alternatively, it is possible to prepare dedicated hardware (such as an LSI) for each of the processes. It should be noted that the hardware configuration of the OLT is not limited to this but may be configured in various way as is necessary.

Figure 3:
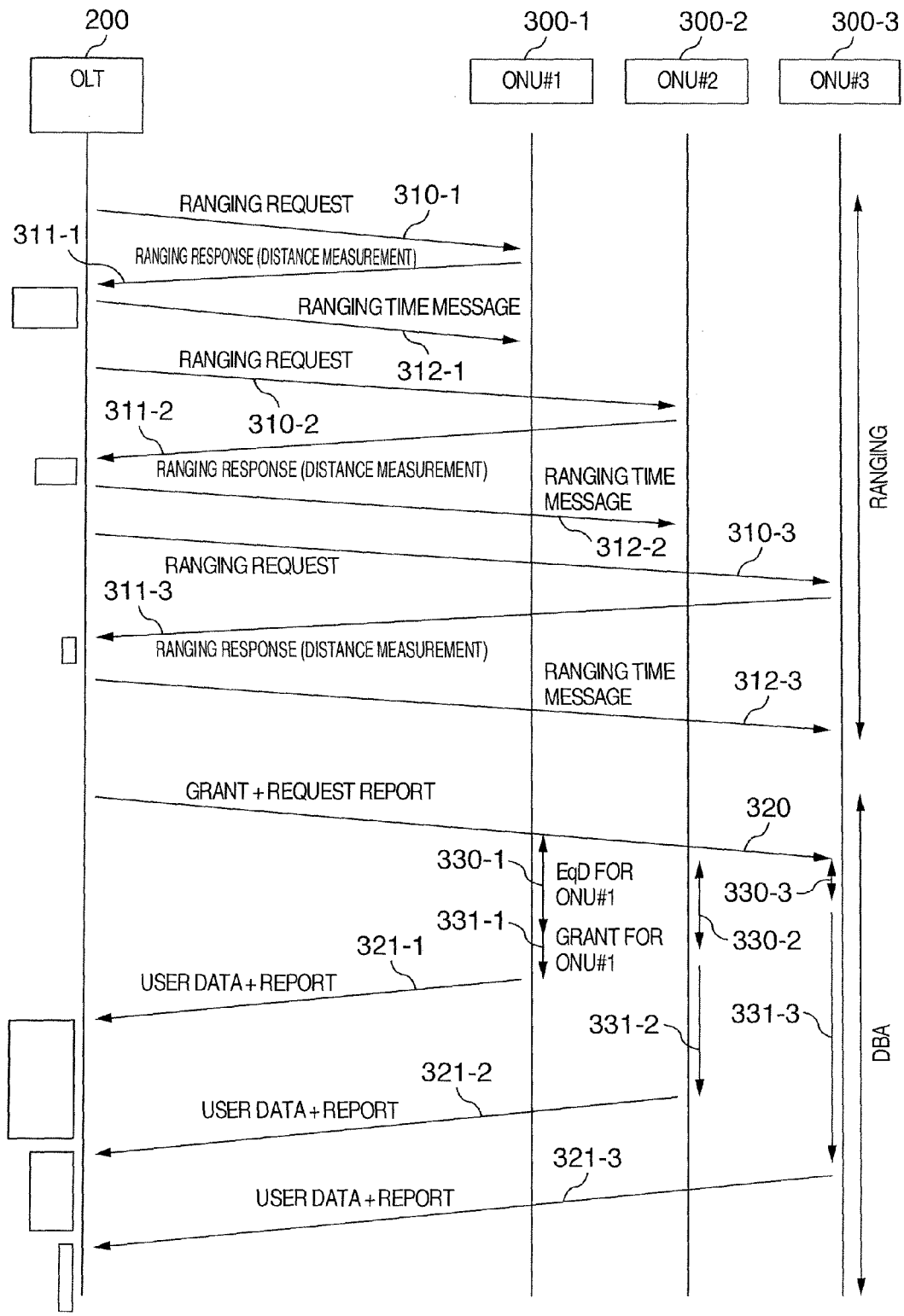
FIG. 3 explains a ranging process signal.

Next, explanation will be given on a series of operations performed by the OLT 200 to indicate the optical signal transmission timing to each ONU. FIG. 3 shows an outline of the ranging process performed by the distance measuring unit 205. The ranging process is defined by ITU Recommendation G. 984.3, Chapter 10. According to control of the distance measuring unit 205, the OLT 200 transmits a ranging request signal 310-1. The ONU 300-1 receives the ranging request signal 310-1 and transmits a ranging response signal 311-1 after a predetermined time has elapsed. The OLT distance measuring unit 205 judges the distance to the ONU 300-1 from the difference between the transmission timing of the ranging request signal 310-1 and the reception timing of the ranging response signal 311-1 and calculates an equalization delay (EqD) for compensating the transmission delay generated by the distance difference of the optical transmission path. The distance measuring unit 205 of the OLT 200 transmits a ranging time message 312-1 including the equalization delay amount 330-1 and sets the equalization delay amount 330-1 in the ONU 300-1.

Figure 18:
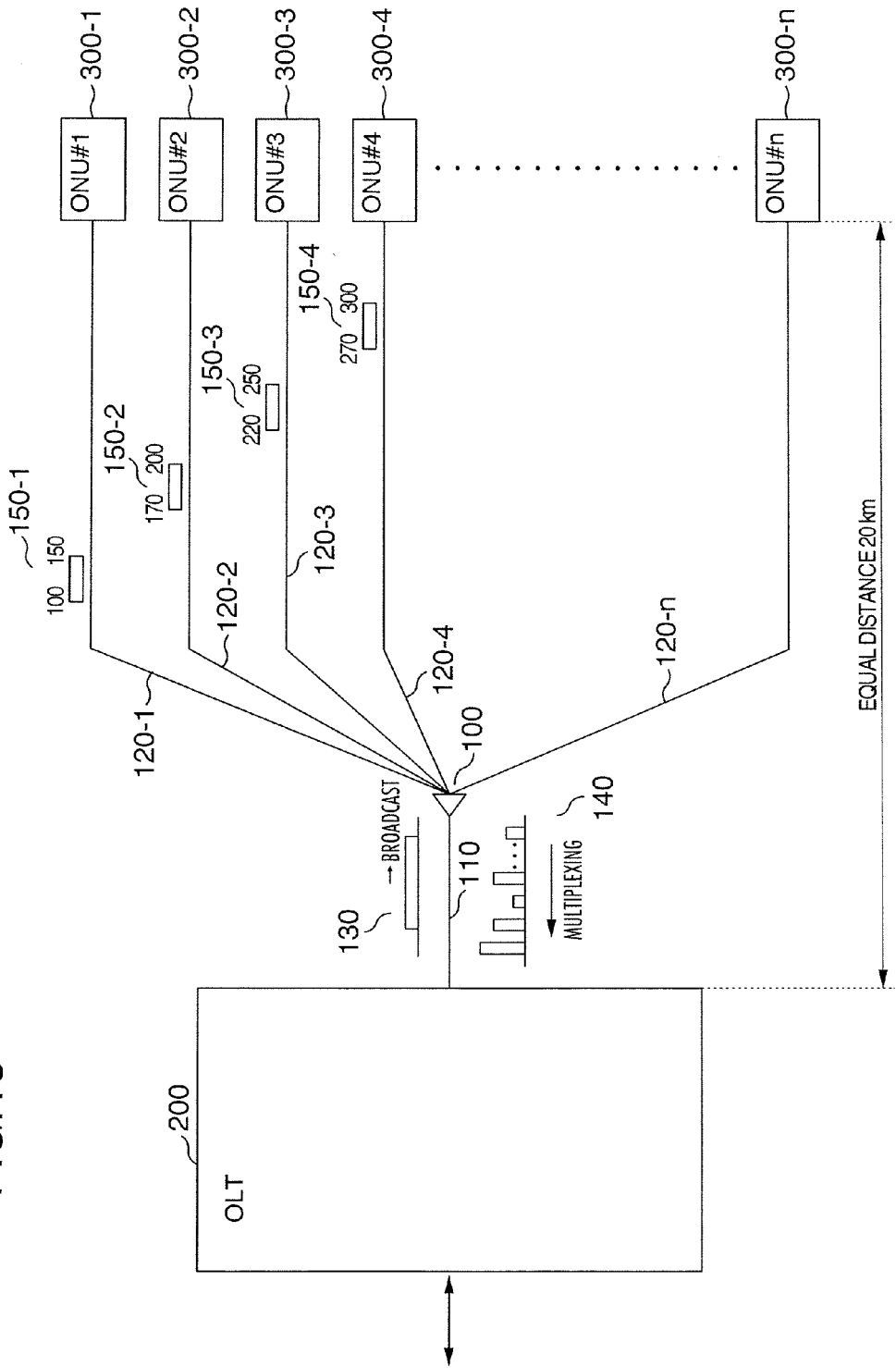
FIG. 18 is a diagram showing Ranging operation.

The equalization delay amount is a value set for absorbing a transmission time difference caused by that the actual distance between the OLT 200 and an ONU 300 is different from 20 km when the OLT 200 decides the optical signal transmission timing for each ONU, assuming, for example, that all the ONUs 300 are equally located at a distance of 20 km. And the value differs depending on the distance between the OLT 200 and the ONU 300. As shown in FIG. 18, by the operation of the equalization delay amount 330-1, the ONU 300-1 is adjusted as if it were at the distance of 20 km from the OLT 200 regardless of the physical installation position. Similarly, since the OLT 200 can handle all the other ONU as if they were connected, for example, at a distance of 20 km, it can decide the optical signal transmission timing for each ONU so that a plurality of ONU optical signal are arranged in such a manner that they will not collide with one another. It should be noted that the distance 20 km is merely an example and the distance is not limited to this.

Similarly, the distance measurements of the ONU 300-2 and the ONU 300-3 are performed. The distance measuring unit 205 calculates the equalization delay amount to be set for each ONU 300. The distance measuring unit 205 reports the equalization delay amounts of the respective ONUs thus obtained to the transmission permission unit 206. The transmission permission unit 206 decides the optical signal transmission timing of each ONU 300 so that the optical signals will not collide with one another, assuming that each ONU 300 is equally at a distance of, for example, 20 km from the OLT 200 and transmits a grant message including the decided transmission timing (Start value) to each ONU.

In the example shown in FIG. 3, the OLT 200 transmitting the grant and the request report message 320 so as to give a permission of an upstream optical signal transmission to ONU 300-1, ONU 300-2, and ONU 300-3 and requests each ONU to report a data mount to be transmitted to the OLT 200. In response to this message, the ONU 300-1 transmits user data and a report 321-1 to the OLT 200. The report contains the amount of the upstream signal waiting for transmission in the ONU 300-1 in the number of bytes. The ONU 300-1 transmits the user data and the report 321-1 at a timing delayed by the equalization delay amount 330-1 with respect to the instructed transmission timing 331-1 of the optical signal.

The ONU 300-2 and the ONU 300-3 perform the similar transmission control. With this operation, when the OLT 200 receives the upstream signals, the user data and the report 321-1 from the ONU 300-1, the user data and the report 321-2 from the ONU 300-2, and the user data and the report 321-3 from the ONU 300-3 are effectively arranged to reach the OLT 200 without causing a collision or being greatly separated from one another.

According to the report received from each ONU, the transmission permission unit 206 of the OLT 200 can know how much waiting data each ONU 300 has and periodically performs dynamic band assignment (DBA) for assigning a plenty of transmission band for the ONU 300 having a plenty of transmission wait data. Besides, the transmission permission unit 206 receives band setting information for the ONU 300 from the monitor control unit 204 such as least band guarantee information as the information on the least band to be given to a certain ONU if necessary. The transmission permission unit 206 decides how much communication band is to be given to each ONU 300 together with such information and decides the optical signal transmission timing of each ONU. In this embodiment, the communication band is a difference between the start value and the end value of each ONU, i.e., the length of time permitted for transmission of the optical signal. It should be noted that when the transmission permission unit 206 performs the DBA process, whether to use the band setting information from the monitor control unit 204 depends on the PON administrator policy.

Figure 4:
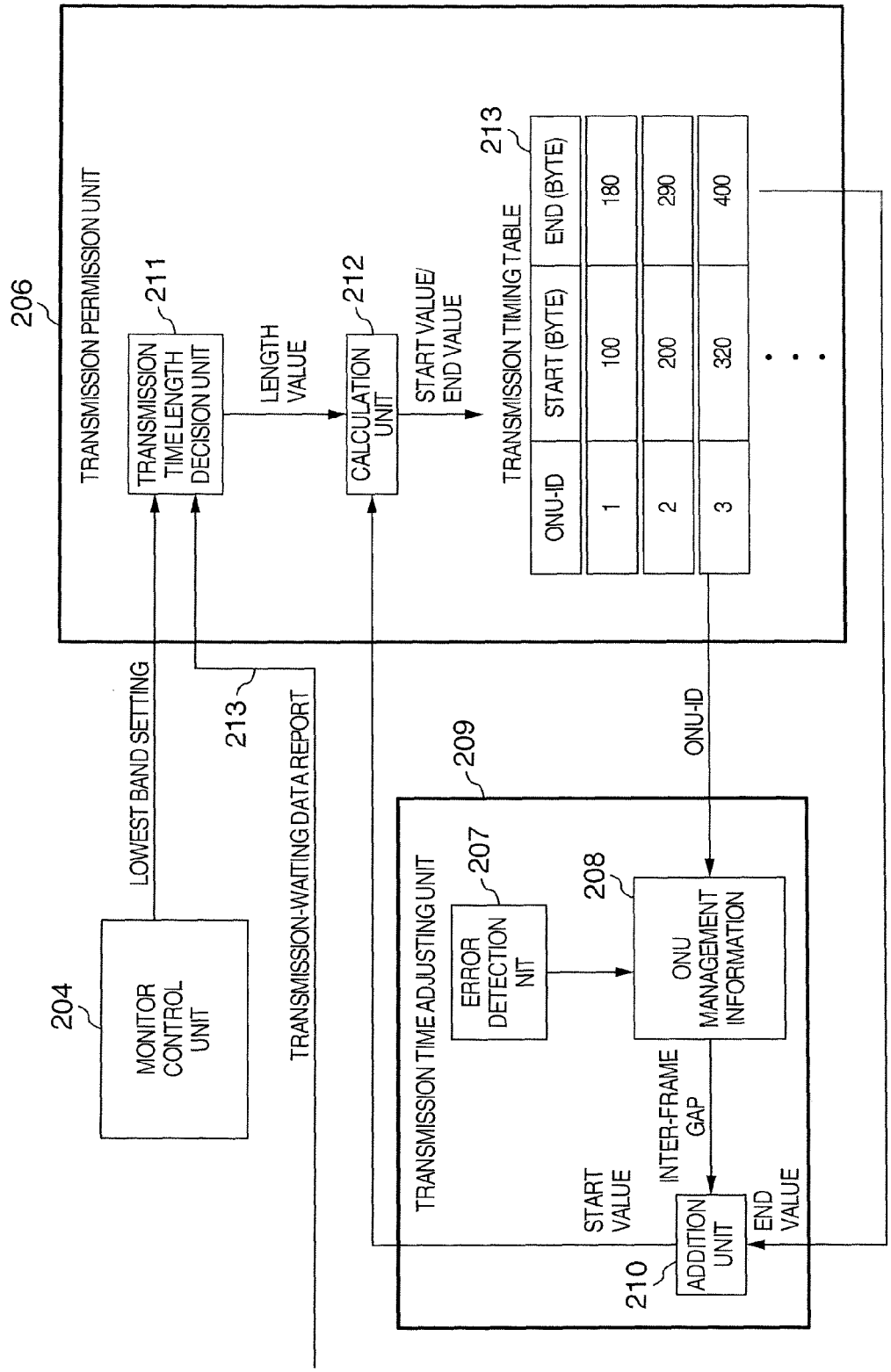
FIG. 4 is a detailed diagram of a part for deciding a transmission timing.

FIG. 4 is a diagram explaining details of the transmission permission unit 206 and the transmission time adjusting unit 209. The transmission permission unit 206 has a transmission timing table 213. The transmission timing table 213 contains an ONU-ID as information uniquely identifying each ONU 300, a start value indicating the optical signal transmission start timing of the ONU, and an end value indicating the optical signal transmission end timing. In the example of FIG. 4, the transmission permission unit 206 makes a decision to permits the ONU having 1 for the ONU-ID to start transmission of an optical signal of the PLOAM region at the timing of the 100-th byte and end the frame payload optical signal transmission at the timing of the 180-th byte. The transmission permission unit 206 reports the start value and the end value decided by the transmission timing table 213 through the grant message to each ONU.

A transmission time length deciding unit 211 decides the byte length (length value) of the optical signal permitted to be transmitted from each ONU 300 according to the band setting information to ONU 300 received from outside the device via the monitor control unit 204 and the transmission-waiting data amount contained in the report message received from each ONU. The transmission time length deciding unit 211 performs the aforementioned DBA process and the optical signal transmission time length for each ONU 300 so as to assign a communication band.

According to the information stored in the ONU management information 208, the transmission time adjusting unit 209 makes an appropriate adjustment for the two ONU which successively transmit optical signals, i.e., appropriately adjusts the inter-frame gap 170 as a difference between the end value of the ONU which transmits an optical signal firstly and the start value of the ONU which transmits an optical signal next. It should be noted that a calculation unit 212 may includes the transmission time adjusting unit 209 as part of it.

FIG. 5 and FIG. 6 show an example of the ONU management information. FIG. 5 shows a reception signal management table 500 which holds the power of an optical signal from each ONU 300 measured by the reception light power measuring unit 210 with the power being associated with the ONU-ID. Moreover, FIG. 6 shows inter-frame gap data 600 relating to two ONUs which successively receive optical signals. That is, the inter-frame gap data 600 holds the power of the optical signal received from the first ONU with the power being associated with the inter-frame gap value to be set to the second ONU which receives an optical signal next. The relationship between the optical signal power and the inter-frame gap length in the inter-frame gap data 600 differs depending on the APD used.

Upon reception of the ONU-ID from the transmission permission unit 206, the transmission time adjusting unit 209 references the reception signal management table 500 and acquires the reception light intensity of the ONU. When each buffer has only one buffer, the T-CONT ID value may be used directly as the ONU-ID. Alternatively, it is possible to prepare a correspondence table indicating correspondence between the ONU-ID and the T-CONT ID so that the ONU-ID of the ONU to which the T-CONT ID belongs is reported from the transmission permission unit 206 to the transmission time adjusting unit 209.

Next, the transmission time adjusting unit 209 references the inter-frame gap data by using the acquired reception light intensity and acquires the inter-frame gap length corresponding to the reception light intensity. The transmission permission unit 206 also transmits the end value held in association with the ONU-ID to the transmission time adjusting unit. The transmission time adjusting unit 209 adds the acquired inter-frame gap and the received end value so as to calculate the start value of the ONU which receives the optical signal next to the ONU identified by the ONU-ID and transmits the start value to the calculation unit 2123 of the transmission permission unit 206.

The calculation unit 212 adds the length value decided by the transmission time length deciding unit to the start value decided by the transmission time adjusting unit 209 so as to calculate the end value of each ONU 300. The calculation unit 212 stores the start value from the transmission time adjusting unit 209 and the end value calculated by itself in the transmission timing table 213 for each ONU-ID. The calculation unit 212 performs a process for the length value and the start value for each ONU-ID and creates a transmission timing table 213. For this, transmission permission unit may prepare a table holding the length value corresponding to the ONU-ID, so that the calculation unit 212 access the table to perform a process for each ONU-ID.

It should be noted that in this embodiment, the transmission time adjusting unit 209 calculates the start value. However, it is also possible that the transmission permission unit 206 acquires the inter-frame gap directly from the ONU management information 208 and the calculation unit 212 adds the end value and the inter-frame gap so as to calculate the start value. Moreover, in the example of FIG. 4, optical signals are received from ONU in the ascending order of the ONU-ID. However, the order of the ONU to receive the optical signal is not to be decided by the ONU-ID. The OLT can arbitrarily decide the order of the ONU transmitting an optical signal.

Figure 7:
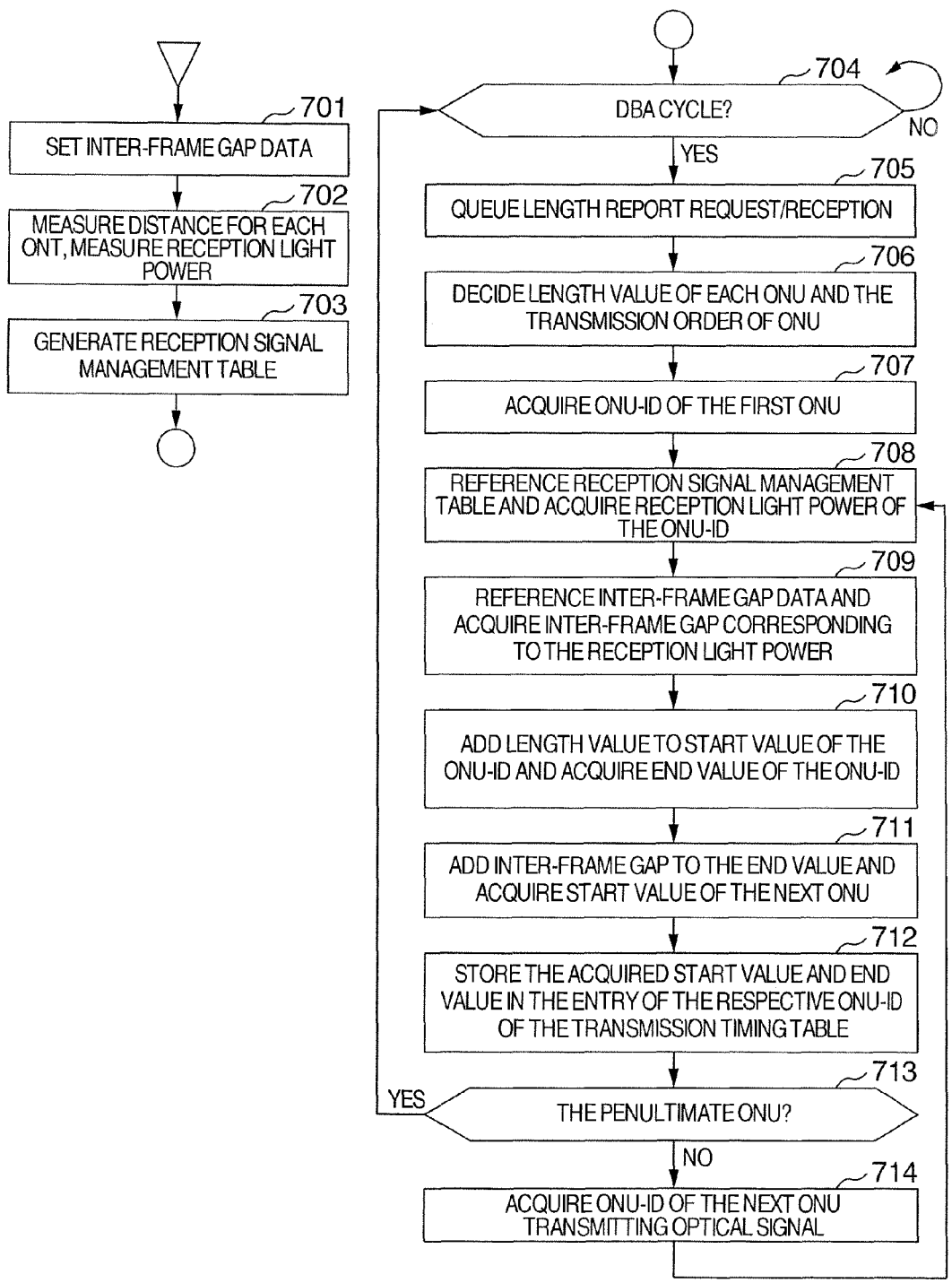
FIG. 7 is a flowchart according to the first embodiment.

FIG. 7 is a flowchart showing a series of processes in the present embodiment. The present embodiment measures/accumulates reception power for each ONU 300 and sets an inter-frame gap corresponding to the power. Firstly, a test is made to decide the least intensity of the optical signal which can be normally received by the APD of the OLT 200 and decision is made how much inter-frame gap is assigned for an optical signal of a certain power, thereby creating inter-frame gap data 600 (701). Next, a distance measuring unit 205 performs the Ranging process for measuring a distance between the OLT 200 and each ONU 300 (702). Simultaneously with this Ranging process, a reception light power measuring unit 210 measures the intensity of the Ranging response message optical signal returned from each ONU 300, thereby creating a reception signal management table 500 (703).

Upon completion of the aforementioned initialization operation, data is transmitted and received between the OLT 200 and each ONU 300. Here, the OLT 200 performs the DBA process periodically, for example, for each 1 ms (704). The OLT 200 request each ONU 300 to transmit a report on the transmission-waiting data and receives it. The OLT 200 decides a band to be assigned for each ONU 300, i.e., decides the length value of each ONU, considering how much data remains in each ONU. Simultaneously with this, the OLT 200 decides in which order a plurality of ONUs transmit optical signals.

The OLT 200 acquires the ONU-ID of the ONU which firstly transmits an optical signal (707), acquires the reception light power of the ONU-ID from the reception signal management table 500 (708), and acquires the inter-frame gap corresponding to the reception light power by referencing the guard data time (709). The OLT 200 ads the length value of the start value of the ONU-ID to calculate the end value of the ONU-ID (710) and adds the acquired inter-frame gap to this end value so as to acquire the start value of the ONU which transmits an optical signal next (711).

The OLT 200 stores the end value in the entry of the ONU which transmits an optical signal firstly and the start value in the entry of the ONU which transmits an optical signal later in the transmission timing table (213). After this, the OLT 200 checks whether the ONU-ID acquired firstly is the ID of the ONU which transmits an optical signal lastly but one (713). If so, the OLT 200 waits for the DBA cycle again (704). Otherwise, the OLT 200 acquires the ONU-ID of the ONU which transmits an optical signal next, i.e., the ONU-ID of the ONU containing the start value as an ONU-ID to be used in the next process turn and returns to the process of (708).

Embodiment 2

As another embodiment, it is possible to use the inter-frame gap shown in FIG. 8 instead of the inter-frame gap shown in FIG. 6. The table shown in FIG. 8 is based on the idea that a long inter-frame gap need not be assigned even if a great signal distortion is generated immediately after a large-amplitude burst signal because degradation given to the signal is small if the signal amplitude received subsequently is also large. The inter-frame gap in FIG. 8 is as follows. The relationship of a power of an optical signal received firstly and a power of an optical signal to be received after this is checked in advance, and an appropriate inter-frame gap corresponding to the relationship is stored in the inter-frame gap data 800.

Figure 9:
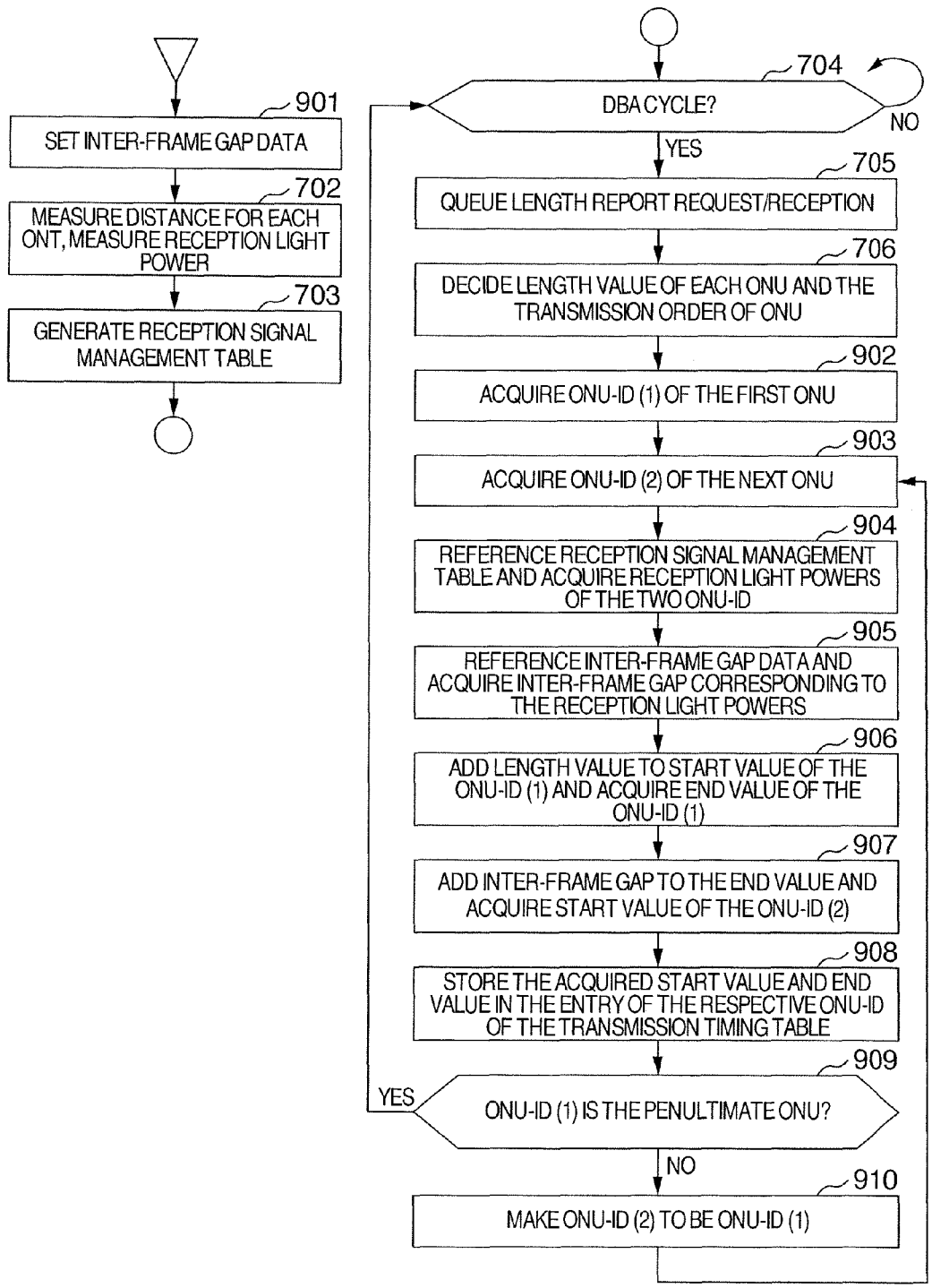
FIG. 9 is a flowchart according to the second embodiment.

FIG. 9 is a flowchart showing a series of processes in this embodiment. The same processes as in the processes of FIG. 7 are denoted by the same reference symbols. In this embodiment, firstly, intensity of each reception light in the OLT 200 is checked so as to judge whether the reception light can be normally received, thereby creating the inter-frame gap data 800 in FIG. 8. The OLT 200 performs the DBA process (706) and then performs a process for the ONU from which an optical signal is successively to be received. That is, the OLT acquires the ONU-ID of the ONU from which an optical signal is to be received firstly as ONU-ID (1) (902) and the ONU-ID of the ONU from which an optical signal is to be received subsequently as ONU-ID (2) (903). Then, the OLT 200 reads out the reception light power of the ONU-ID (1) and the ONU-ID (2) from the reception signal management table (500) (904) and references the inter-frame gap data 800 to acquires the inter-frame gap length stored in the entry having the reception light power of the ONU-ID (1) as the forward reception light power and the reception light power of the ONU-ID (2) as the backward reception light power (905).

The OLT 200 adds the length value to the start value of the ONU-ID (1) so as to obtain the end value of the ONU-ID (1) (906) and adds the acquired inter-frame gap to the end value so as to obtain the start value of the ONU-ID (2) (907). the OLT 200 stores the end value of the ONU-ID (1) and the start value of the ONU-ID (2) in the transmission timing table 213 (908).

Lastly, it is checked whether the ONU-ID (1) is the last ONU but one which transmits an optical signal (909). If so, the OLT 200 waits for the DBA cycle again (704). Otherwise, the ONU-ID (2) of the next ONU to transmit an optical signal, i.e., the ONU-ID (2) is made the ONU-ID (1) to be used in the next process turn (910) and control is returned again to the process of (903).

Embodiment 3

Still another embodiment uses an ONU distance table 1000 instead of the reception signal management table 500 of FIG. 5 and an inter-frame gap data table 1100 of FIG. 11 instead of the inter-frame gap data 600 of FIG. 6. In this embodiment, instead of measuring/accumulating a reception power for each ONU 300, the value of the distance measured for each ONU 300 is used. This embodiment is based on the idea that power of the optical signal received from ONU 300 becomes smaller as the distance value becomes longer and sets an appropriate inter-frame gap by using the distance value instead of the light reception power.

For this, the ONU distance table 1000 contains ONU-ID and its distance from the OLT. Moreover, in the inter-frame gap 1100, an inter-frame gap to be set for each distance is stored. The processing flow in this embodiment is similar to the one shown in FIG. 7 except for that the OLT 200 creates the ONU distance table 100 according to the distance obtained in the Ranging process (703) without measuring reception light power in (702) and that a distance corresponding to the ONU-ID is acquired in the process of (708) and the inter-frame gap corresponding to the distance is acquired in (709). That is, the ONU distance table 1000 contains the measurement results of a distance from each ONU 300 obtained by the OLT 200.

Embodiment 4

This embodiment creates in advance an ONU-frame gap correspondence table 1200 shown in FIG. 12 according to the first, the second, and the third embodiment and counts the number of errors in a signal received from each ONU during device operation by a detection unit 207. According to the number of errors, an inter-frame gap length corresponding to each ONU-ID is repeatedly increased/reduced for adjustment. The ONU-frame gap correspondence table 1200 of FIG. 12 holds the ONU-ID in association with the inter-frame gap length to be set for the ONU which receives an optical signal next to the ONU.

Figure 13:
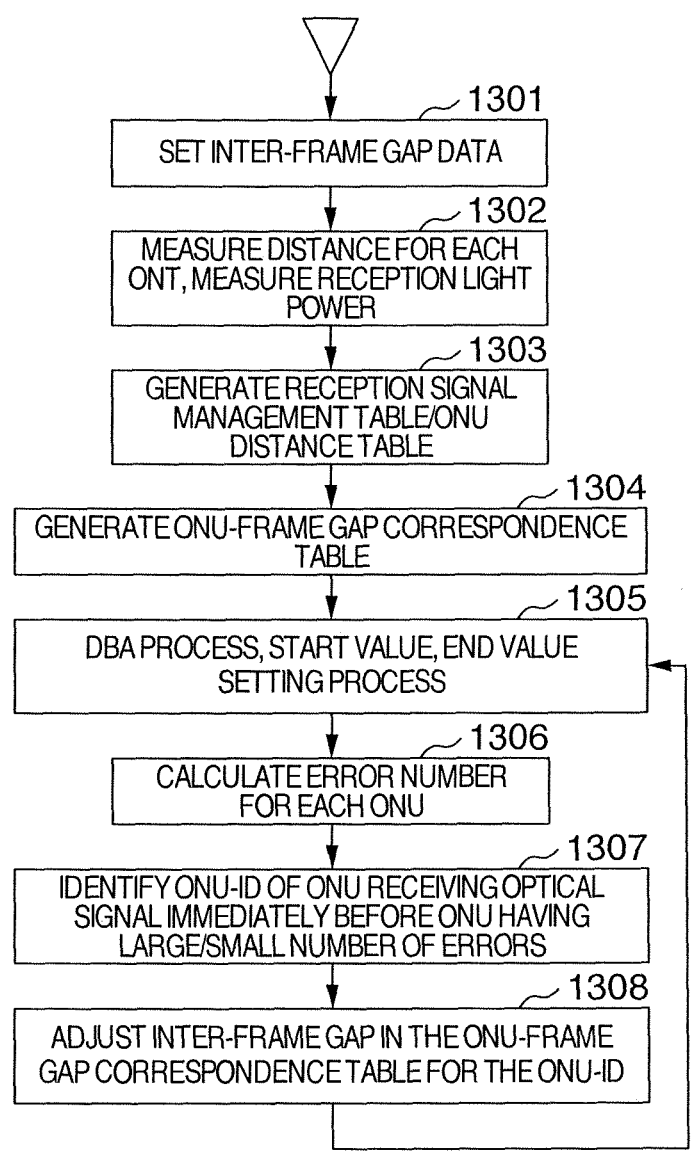
FIG. 13 is a flowchart according to the fourth embodiment.

FIG. 13 is a flowchart of this embodiment. In this flowchart, the inter-frame gap setting portion is omitted and explanation is given on the portion for adjusting the inter-frame gap stored in the ONU-frame gap correspondence table 1200. In this embodiment, when a bit error occurs frequently in a signal received from a particular ONU, it is assumed that the ONU which receives a signal immediately before the particular ONU has a problem and corresponding process is performed. That is, the OLT 200 increase the inter-frame gap of the ONU immediately before the ONU which causes a bit error frequency. Conversely, when a bit error is hardly caused, the inter-frame gap of the ONU immediately before is reduced. These processes are performed repeatedly.

Firstly, the OLT 200 sets an inter-frame gap as the initial value for the inter-frame gap data 600 and the inter-frame gap data 1100 (1301). Next, the OLT 200 performs a distance measurement and a reception light power measurement for each ONU 300 (1302) and creates various tables (1303). Then, the OLT 200 creates an ONU-frame gap correspondence table 1200 from the inter-frame gap data and the various tables (1304) and performs the DBA process and the start value and the end value setting process as shown in FIG. 7 and FIG. 9 (1305). The OLT 2—calculates the number of errors for each ONU (1306), identifies the ONU-ID of the ONU which transmits an optical signal immediately before the ONU which has recorded the number of errors in accordance with the error quantity degree (1307), and adjusts the inter-frame gap in the ONU-frame gap correspondence table 1200 (1308). It should be noted that when the OLT 200 sets the start value and the end value, it references the ONU-frame gap correspondence table 1200 so as to obtain the inter-frame gap directly from the ONU-ID value. This is identical to the first to the third embodiment if such a correspondence table is created.

Furthermore, as a simplified example, there is a method for setting an appropriate inter-frame gap value for the OLT before a start of an ONU so that the OLT generates a grant value in accordance with the set inter-frame gap.

Description will now be directed to effects obtained by the aforementioned embodiments with reference to FIG. 14A to 14D. FIG. 14A and FIG. 14B show effects obtained by the conventional technique and FIG. 14C and FIG. 14D show effects obtained by the embodiments of the present invention. In FIG. 14A and FIG. 14B, upstream light burst signals 1401-1, 1401-2, and 1401-3 from different ONUs 300 are multiplexed by time division and inputted to and received by the OLT 200. In order to prevent collision between the depicted three light burst signals, the OLT 200 assigns inter-frame gaps 1407-1, 1407-2 between the burst signals. Since the distance between the OLT 200 and the ONU 300 differs depending on the installation position of the ONU 300, the amplitudes of the light burst signals 1401-1, 1401-2, and 1401-3 differ as shown in the figure.

When signals of different amplitudes are inputted to the APD, the APD may be such that the light burst signal 1401-1 has a waveform with a long trailing edge due to an output saturation by a large signal, or there may arise a phenomenon that an increase in heat associated with the reception of a strong light signal fluctuates multiplication factor of the APD and accordingly, the amplitude of the light burst signal 1401-2 is small at a front part thereof due to a low multiplication factor and increases as the multiplication factor recovers as drawing apart from the light burst signal 1401-1. On the other hand, the ATC threshold value 1410 maintains the half of the peak value of the signal waveform and is discharged to 0 level when the ATC reset pulse is inputted. As has been described above, when waveform distortions of the light burst signals 1401-1 and 14401-2 are generated, the depicted level is generated for the ATC threshold value 1410. Accordingly, the identified signal 1406 differs from the transmitted data.

In contrast to this, in the embodiments of the present invention, as shown in FIGS. 14C and 14D, according to the amplitudes of the light burst signals 1411-1, 1411-2, and 1411-3, the length of the subsequent inter-frame gaps 1417-1 and 1417-2 are changed, which prevents generation of a waveform distortion in the light burst signals 1411-1, 1411-2. Even when the phenomenon of the long trailing edge is generated in the light burst signal 1411-1 of a large amplitude, by assigning a sufficiently long inter-frame gap 1417-1, it is possible to prevent generation a waveform distortion in the light burst signal 1411-2. Simultaneously with this, it is expected that the multiplication factor fluctuation of the APD is stabilized after the long inter-frame gap 1417-1. In this sense also, it is possible to prevent generation of a waveform distortion in the light burst signal 1411-2. In this case, the ATC threshold value 1420 is generated as is expected as shown in the figure and the identified signal 1416 indicates a correct value.

In the aforementioned embodiments, explanation has been given by assuming that the grant is the GPON defined by ITU-T Recommendation G. 984 series. However, it is also possible to employ the EPON defined in IEEE 802.2 Standard, Chapter 64. Here, the grant is expressed by the Start value specifying the start of the transmission permission and the Length value permitting the transmission, and the End value is obtained by adding the Length value to the Start value.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A station side communication device connected to a plurality of subscriber side communication devices via a light multiplex/demultiplex device and deciding an order of optical signal transmissions from the subscriber side communication devices and deciding and instructing a transmission start timing for starting transmission of an optical signal for each of the subscriber side communication devices, the station side communication device comprising:

an optical signal monitor unit which monitors powers of optical signals received from the subscriber side communication devices;

a transmission time adjusting unit which, based on a power of an optical signal of a first of said subscriber side communication devices that is monitored by said optical signal monitor unit, decides as to how long a length of transmission interval is to be placed before a second of said subscriber side communication devices that will transmit an optical signal next after said first subscriber side communication device, starts to transmit the optical signal, after completion of optical signal transmission by said first subscriber side communication device; and a transmission permission unit which decides the transmission start timing of the second subscriber side communication device by using the transmission interval decided by the transmission time adjusting unit.

2. The station side communication device as claimed in claim 1, further comprising:

an inter-frame interval table which stores therein powers of a plurality of optical signals and a plurality of the transmission interval by respectively associating with each other, wherein the transmission time adjusting unit refers to said inter-frame interval table by using a power of an optical signal of the first subscriber side communication device to decide a transmission interval.

3. The station side communication device as claimed in claim 1, wherein:

the transmission permission unit decides and instructs a transmission end timing for terminating transmission of an optical signal which starts at the transmission start timing for each of the subscriber side communication devices, and the transmission permission unit decides the transmission start timing of the second subscriber side communication device based on the transmission end timing of the first subscriber side communication device and the transmission interval decided by the transmission time adjusting unit.

4. The station side communication device as claimed in claim 1, wherein:

the transmission permission unit decides and instructs an optical signal transmission time as a length of time permitting continuous transmission of an optical signal for each of the subscriber side communication devices, and the transmission permission unit decides the transmission start timing of the second subscriber side communication device based on the optical signal transmission time of the first subscriber side communication device and the transmission interval decided by the transmission time adjusting unit.

5. The station side communication device as claimed in claim 2, wherein the powers of optical signals and transmission intervals stored in the inter-frame interval table are associated with each other such that transmission interval increases as power of an optical signal increases.

6. The station side communication device as claimed in claim 5, wherein the correspondence relationship between the powers of the optical signal and the transmission intervals stored in the inter-frame interval table is decided according to characteristics of an element for converting an optical signal received from the subscriber side communication device into an electric current.

7. The station side communication device as claimed in claim 6, wherein the element is an avalanche photo diode (APD).

* * * * *